United States Patent
Zwack

(10) Patent No.: US 6,922,742 B2
(45) Date of Patent: Jul. 26, 2005

(54) NODE DEVICE FOR A SERIAL DATABUS CONNECTING A NUMBER OF DEVICES

(75) Inventor: Eduard Zwack, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 374 days.

(21) Appl. No.: 10/011,156

(22) Filed: Dec. 5, 2001

(65) Prior Publication Data

US 2002/0097788 A1 Jul. 25, 2002

(30) Foreign Application Priority Data

Dec. 7, 2000 (DE) .......................... 100 60 938

(51) Int. Cl.[7] ................................................ G06F 3/00
(52) U.S. Cl. .............................. 710/38; 710/16; 710/18; 710/37
(58) Field of Search ............................ 710/15, 16, 17, 710/18, 19, 36, 37, 38, 8, 9, 62–64

(56) References Cited

U.S. PATENT DOCUMENTS

| | | | | |
|---|---|---|---|---|
| 4,646,361 A | * | 2/1987 | Usui .......................... | 455/601 |
| 4,837,785 A | * | 6/1989 | McAlpine .................... | 370/85 |
| 5,321,394 A | * | 6/1994 | Carlton et al. .............. | 340/825 |
| 5,867,484 A | * | 2/1999 | Shaunfield ................... | 370/254 |
| 5,978,390 A | * | 11/1999 | Balatoni ..................... | 370/540 |
| 6,086,430 A | * | 7/2000 | Amoni et al. ............... | 439/680 |
| 6,157,972 A | * | 12/2000 | Newman et al. ............ | 710/100 |

OTHER PUBLICATIONS

Ron White, How Computers Work, Que, Sixth Edition, p. 207.*

* cited by examiner

*Primary Examiner*—Kim Huynh
*Assistant Examiner*—Alan S Chen
(74) *Attorney, Agent, or Firm*—Bell, Boyd & Lloyd LLC

(57) ABSTRACT

A node device for a serial databus connecting a number of devices, having in each case three input and output units, in which case a second output unit of the node device can, in each case, be connected to a first input unit of a second node device of the databus. A third output unit of the node device can be connected to an input unit of a device, and a third input unit of the node device can be connected to an output unit of the device. The node device contains a multiplexer for connecting the first or third input unit to the second output unit of the node device and, furthermore, a detector, which is coupled to the first input unit, to the third input unit and to the multiplexer, for detection of an incoming data stream at the first and/or third input unit for appropriate control of the connection of the multiplexer.

10 Claims, 3 Drawing Sheets

NODE DEVICE FOR A SERIAL DATABUS CONNECTING A NUMBER OF DEVICES

BACKGROUND OF THE INVENTION

Against the background of a growing number of devices which are connected to local area networks, and a simultaneous increase in the data transmission rate in such local area networks, increased attention is being paid, firstly, to optimum-cost line routing and, secondly, to devices for ensuring that the signal quality is as high as possible.

One of the embodiments of local area networks that is used is the so-called Ethernet. The Ethernet is based on a serial databus with a number of devices (for example, data processing devices or communications terminals) which are connected to the databus and can at the same time each either receive or transmit data, with a device checking, before transmission access, that is to say the transmission of a so-called data packet, whether any data packets are currently being sent via the databus and, in situations in which this is the case, preventing transmission access by that device. As a result of the delay time effects that occur in relatively long databuses, it is possible for a situation to occur in which two devices are transmitting data packets simultaneously via the databus, thus resulting in the data packets associated with the different transmission devices colliding. This collision is generally identified by both transmitting devices, which then interrupt the transmission access and start again only after a time period which is chosen randomly by the devices.

Different types of coupling elements (referred to as node devices in the following text) are used for structuring a local area network, and the databus if the local area network is configured in the form of the Ethernet, into individual segments.

In the simplest case, a node device is in the form of a station, frequently referred to as a repeater in the literature, which receives data packets from a first segment of the databus, and passes them on to a second segment of the databus. This passing-on process is generally associated with signal regeneration, that is to say amplification and reshaping of the signal of the received data packets. Furthermore, electrical insulation and termination of the line are carried out between the connecting units of the node device, thus suppressing echo effects.

Differently configured node devices, frequently referred to as hubs in the literature, in contrast, allow a number of devices or else segments, to be linked in the form of a star to a databus. In a comparable way to a repeater, data packets (generally after comparable signal generation) are passed on identically to all the connections of the hub, and the connections are electrically insulated from one another and terminated.

When planning a local area network, active node devices generally have to be provided at regular intervals as the data transmission rate rises. Thus, the frequency of the data signals becomes higher, which compensates for any deterioration of the signal quality resulting from signal regeneration and termination of the signal-carrying lines.

An arrangement which allows the signal quality to be maintained in a local area network is distinguished, for example, by a large number of hubs which are each connected to one another via a short databus. Each hub, in this case, concentrates a number of devices connected to it at one node of the databus. This network design, which is frequently chosen for wiring at floor level in buildings, firstly has the advantage of small segmentations of a local area network and, thus, high signal quality. On the other hand, the resultant star-shaped topology has a disadvantageous effect on the complexity of the network wiring.

The present invention is directed toward specifying a node device which makes it possible to connect devices to a databus with little wiring complexity.

SUMMARY OF THE INVENTION

According to the present invention, a second output/input unit pair of the node device is connected in series with a first output/input unit pair of a further node device, thus forming a serial databus. A third output/input unit pair of the node device is connected to a device; for example, a data processing device or a communications terminal. If this device does not make any transmission access to the databus, one output of the device is disconnected from the databus via a multiplexer arranged in the node device. If, in contrast, the device starts transmission access, the transmission of the data packets sent from the device is identified by a detector arranged in the node device, which causes the multiplexer to be switched to the node device input associated with the output of the device. The data packet is thus passed to the second output of the node device.

The device is connected to the databus by the node device only in situations in which the device is making a transmission access to the databus. The total length of the databus is thus kept as short as possible. During device transmission pauses, the shorter bus length has the advantage that it is possible to ensure better signal quality for the data packets on the databus, since the adverse effects on the signal due to reflections and attenuation increase as the length of the databus increases.

One advantageous embodiment of the present invention provides for a number of node devices to be arranged in a chain structure on the databus in order to connect further devices to the databus via a respective node device. A further embodiment of the present invention provides for the second output unit to be fed back to the node device which forms the last link in the chain structure. This development results in the databus having a ring topology, which results in advantageous distribution of the data packets on the databus.

A high signal quality is achieved for the data packets transmitted via the databus via the input and output units being configured with signal-regenerating amplifiers, and the input units with line terminations.

According to a further embodiment of the present invention, the node devices are supplied with electrical power via the databus. This makes it possible to save additional power supply lines for the node devices. Furthermore, the devices connected to the node devices likewise can be supplied with electrical power via the databus.

Additional features and advantages of the present invention are described in, and will be apparent from, the following Detailed Description of the Invention and the Figures.

DETAILED DESCRIPTION OF THE INVENTION

Figure 1:
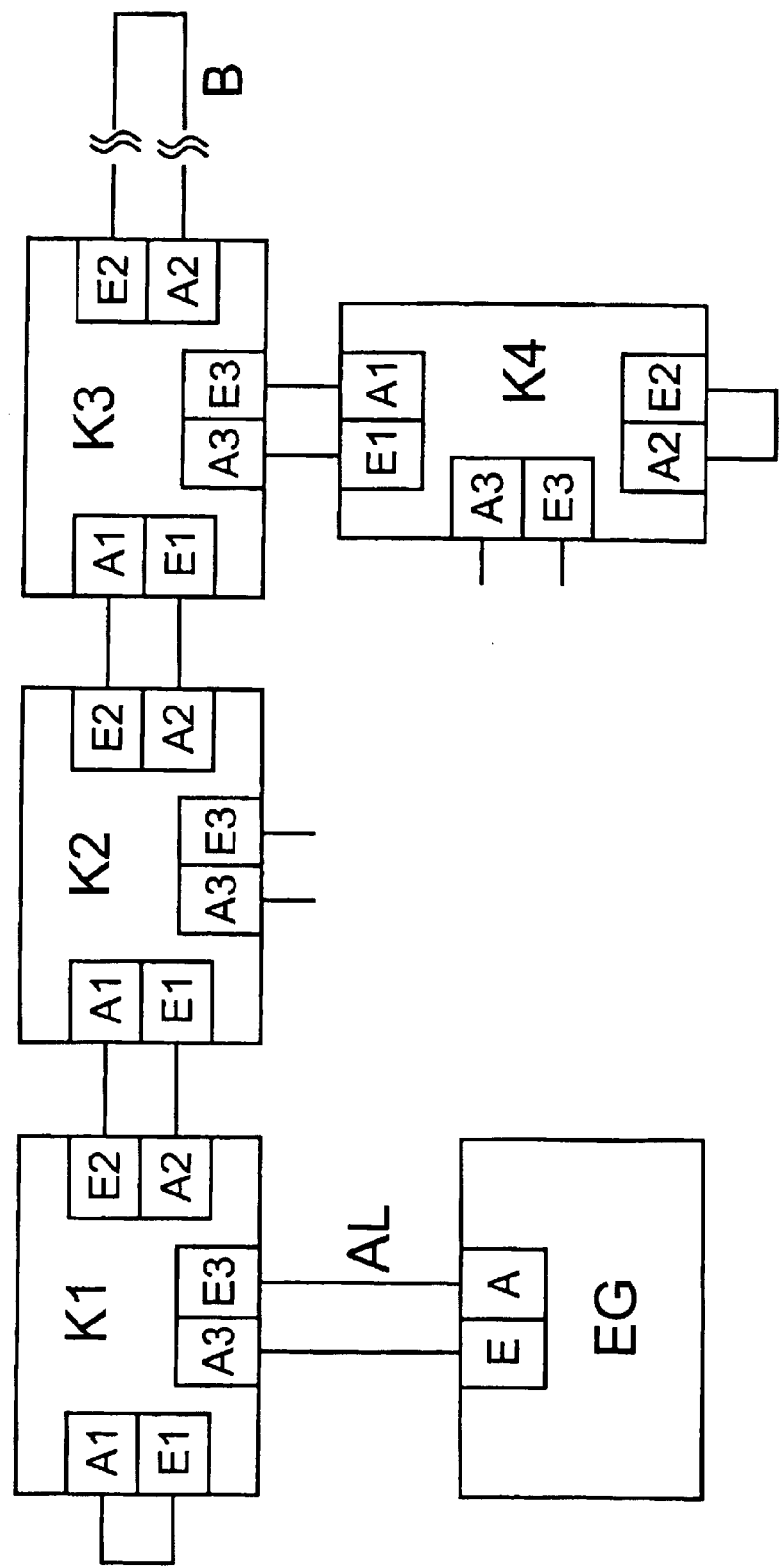
FIG. 1 shows a structogram, schematically illustrating the major functional units of a databus.

FIG. 1 shows a databus B which connects a number of node devices K1, K2, K3 in the form of a chain. The node devices K1, K2, K3 each have three input units E1, E2, E3, and three outputs units A1, A2, A3. In this case, a first output/input unit pair A1, E1 of a node device K2 is connected to a second input/output unit pair E2, A2 of the preceding node device K1 in the chain structure, and the second output/input unit pair A2, E2 of the node device K2 is connected to a first input/output unit pair E1, A1 of a subsequent node device K3 in the chain structure. In the node device K1 which forms the start of the chain structure, the first input unit E1 of the node device K1 is connected to the first output unit A1 of the node device K1, so that the databus B is closed in a structure in the form of a ring. A similar procedure is used at the other end of the chain structure, for the third and fourth node devices K3, K4, by the respective second input unit E2 being connected to the respective second output unit A2 of the respective node device K3, K4. In FIG. 1, wavy lines are used to indicate that further node devices can be arranged after the node device K3, which forms the illustrated end point of the chain structure.

A device EG (for example, data processing devices or communications terminals) can be connected to each of the node devices K1, K2, K3), via their respective third input/output unit pair E3, A3 as is shown for the node device K1 in FIG. 1, with the output unit A of the device being connected to the input unit E3 of the node device, and the input unit E of the device being connected to the output unit A3 of the node device. Alternatively, a further node device K4 also can be connected to each of the node devices K1, K2, K3 which form the chain structure of the databus B, as illustrated for the node device K3 in FIG. 1, in order to achieve, for example, a branch in the databus B.

The node devices K1, . . . , K4 are each in the form of an Ethernet connecting socket, to which a connecting line AL produces a connection from the third output or input unit A3, E3 to the input or output unit E, A of the device EG via a standard plug connection.

In the present exemplary embodiment, the architecture of the databus B is based on the Ethernet specifications. A four-wire, twisted line with a balanced transmission method is used as a transmission medium; that is, of these four wires in the line, two wires (a signal wire and an associated ground wire) are reserved for the transmission direction, and two wires are reserved in a corresponding manner for the reception direction. To make the illustration of the databus B and of the connecting line AL clearer, FIG. 1 shows only the respective signal wires, with their associated ground wires being omitted.

The input units E1, E2, E3 and the output units A1, A2, A3 of the node devices K1, . . . , K4 each have signal-regenerating devices; for example, amplifiers. In comparison to the wiring as already mentioned above using a hub which is likewise equipped with signal-regenerating functions, the wiring between node devices arranged in the form of a chain can be configured in a simpler manner than with a star-shaped topology, which results from the use of a hub.

The following text refers further to the functional units shown in FIG. 1.

Figure 2:
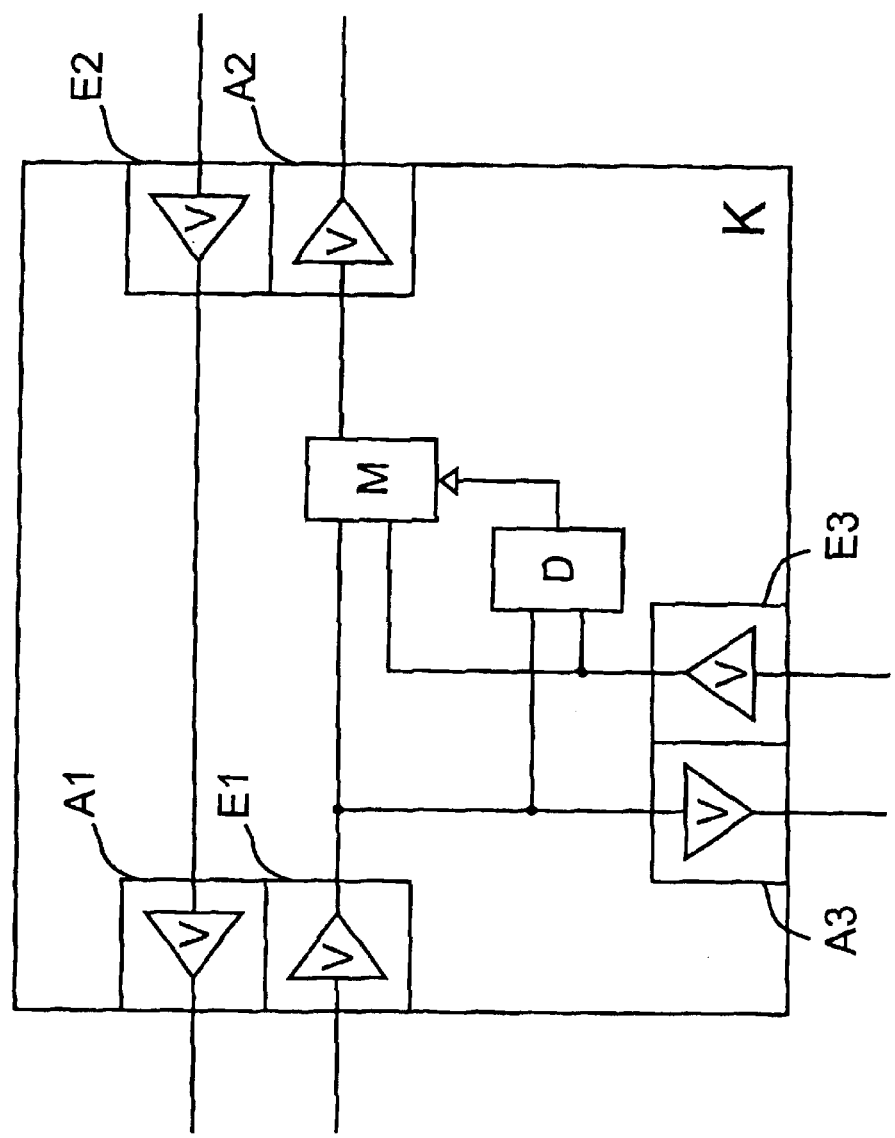
FIG. 2 shows a structogram, schematically illustrating a node device for the databus.

FIG. 2 shows, schematically, the design of a node device K. In addition to other components, which are not illustrated in FIG. 2, each of the output units A1, A2, A3 and input units E1, E2, E3 of the node device K contains an amplifier V, which is illustrated here in a manner making it easier to determine the direction of the data packets arriving at the node device K and those leaving the node device K. Analogously to the illustration in FIG. 1, FIG. 2 also shows only the respective signal wires without their associated ground wires.

The second input unit E2 of the node device K is connected directly to the first output unit A1. The input unit E1 of the node device K is wired directly to the output unit A3, and to one input of a multiplexer M. A further input of the multiplexer M is wired to the input unit E3. The output of the multiplexer M is connected directly to the second output unit A2 of the node device K. The two inputs of a detector D of the node device K are connected to the first input unit E1 and to the third input unit E3, respectively. The output of the detector D is connected to a control input of the multiplexer M. Depending on the output signal from the detector D, the multiplexer M passes either the data packets received at the first input device E1 or the data packets received at the third input device E3 to the second output device A2, which is wired to the output of the multiplexer M.

The detector D detects the arrival of data packets at the first and/or third input unit E1, E3, and controls the multiplexer M, which connects that input unit E1, E3 to the output unit A2 at which the detector has established that data packets have arrived.

If no data stream is present either at the first input unit E1 or at the third input unit E3, the multiplexer M connects the first input unit E1 to the second output unit A2. If the detector D now detects a signal due to data packets arriving at the third input unit E3, it actuates the multiplexer M, causing the latter to connect the third input unit E3 to the second output unit A2. When the transmission access by the device EG ends, a dead time of, for example, 2 µs is provided in the detector D before it causes the multiplexer M to switch to the first input unit E1, since the detector cannot distinguish a quiescent state (that is, when the device EG (not illustrated) is not making any transmission access) from transmission of a data sequence having a number of logic zeros.

If a data packet arrives at one of the input units E3, E1 while the multiplexer M is connected from the respective other one of the input units E1, E3 to the second output unit A2, the process of the detector D controlling the multiplexer M to switch to the respective other input unit E3, E1 is inhibited until the detector D detects the end of the data traffic at the originally connected input unit E1, E3. If, for example, as a result of detection of arriving data packets at the first input unit E1 but not at the third input unit E3, the first input unit E1 is connected by the multiplexer M to the second output unit A2, the detector D does not immediately cause the multiplexer M to connect this third input unit E3 to the second output unit A2 when data packets arrive at the third input unit E3, and this is not done until the detector D detects that the arrival of data packets at the input unit E1 has ended.

The time interval which is required for the detector D to detect the arriving data packets and for switching of the multiplexer M can lead temporarily to complete or partial loss of the data packets at the second output unit A2. A temporary data loss likewise occurs when data packets arrive simultaneously at both input units E1, E3, since the multiplexer M can, in each case, connect only one of the two input units E1, E3 to the second output unit A2. However, in both cases, the Ethernet protocol ensures that the entire data record arrives in total at the device declared to be the receiver of these data packets. This is because the Ethernet protocol provides for a transmitting device to simultaneous compare the data packets transmitted on the databus with those sent, and can, thus, identify whether correct transmission, a transmission error or a collision has occurred during the transmission access. In the event of a transmission error, in this situation, partial or complete loss of individual data packets, the Ethernet protocol provides for the transmission attempt to be made once again by the transmitting device at a later time.

If the devices EG are not making any transmission access to the databus B, they are DC-decoupled from the databus B, together with their connecting line AL, by the multiplexer M. This reduces the length of the databus B at times in which the device EG is not making any transmission access. The DC-decoupling of the third input unit E3 from the first input unit E1 by the multiplexer M furthermore ensures that connection of a device EG does not interrupt a data stream which is being transmitted via the databus B and is being passed from the first input unit E1 via the multiplexer M to the second output unit A2.

The power supply for the detector D, for the multiplexer M and for the input and output units E1, E2, E3; A1, A2, A3 can be provided via the databus B or, alternatively, as in the exemplary embodiment, via an external power supply unit (not illustrated) and via appropriate power supply lines (not illustrate).

Figure 3A:
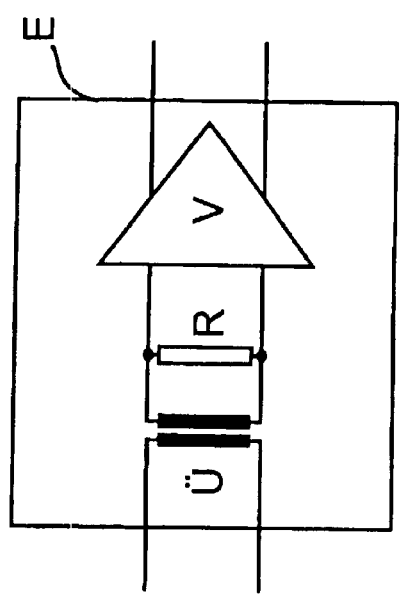
FIG. 3A shows a structogram, schematically illustrating an input unit for the node device.

FIG. 3A shows an input unit E of a node device K, including a transformer Ü for DC-decoupling of the data signal from the databus B, a resistor R which is used as a line termination, and an amplifier V. If the components of the input unit E are chosen appropriately, in particular the bandwidth of the amplifier V, it is possible to achieve a transmission process via the databus B in the frequency range 1–1000 MHz.

Figure 3B:
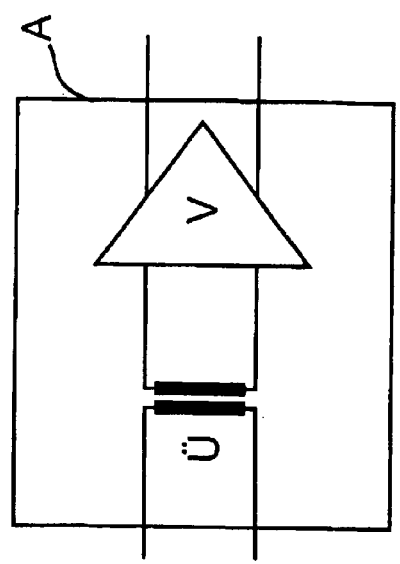
FIG. 3B shows a structogram, schematically illustrating an output unit for the node device.

FIG. 3B shows an output unit A of a node device K, including a transformer Ü and an amplifier V.

Although the present invention has been described with reference to specific embodiments, those of skill in the art will recognize that changes may be made thereto without departing from the spirit and scope of the invention as set forth in the hereafter appended claims.

What is claimed is:

1. A node device for a serial databus connecting a plurality of devices, comprising:

first, second and third input units;

first, second and third output units, wherein the second output unit is connected to a first input unit of a second node device of the databus, the third output unit is connected to an input unit of a further device, and the third input unit is connected to an output unit of the further device;

a multiplexer for connecting one of the first and third input units to the second output unit; and a detector coupled to each of the first input unit, the third input unit and the multiplexer, for detecting an incoming data stream at at least one of the first and third input units for appropriate control of the connection of the multiplexer.

2. A node device for a serial databus connecting a plurality of devices as claimed in claim 1, wherein the plurality of node devices are arranged in a chain structure on the databus.

3. A node device for a serial databus connecting a plurality of devices as claimed in claim 2, wherein, in a furthest node device which forms a last link in the chain structure, the second output unit is fed back to the furthest node device.

4. A node device for a serial databus connecting a plurality of devices as claimed in claim 1, wherein each of the input units and output units includes a signal-regenerating amplifier.

5. A node device for a serial databus connecting a plurality of devices as claimed in claim 4, wherein the signal-regenerating amplifiers of the input units each have an input stage with a line termination.

6. A node device for a serial databus connecting a plurality of devices as claimed in claim 1, wherein the further devices and the node devices are supplied with electrical power via the databus.

7. A node device for a serial databus connecting a plurality of devices as claimed in claim 1, wherein the databus is designed in accordance with an Ethernet standard.

8. A node device for a serial databus connecting a plurality of devices as claimed in claim 1, wherein instead of the further device, a first input unit of a third node device is connected to the third output unit of the node device, and a first output unit of the third node device is connected to the third input unit of the node device.

9. A node device for a serial databus connecting a plurality of devices as claimed in claim 1, wherein the further device is a data processing device.

10. A node device for a serial databus connecting a plurality of devices as claimed in claim 1, wherein the node device is a connecting socket for connecting a connection line to one of the third output unit and the third input unit.

* * * * *